United States Patent
Fujikawa et al.

(10) Patent No.: US 12,427,823 B2
(45) Date of Patent: Sep. 30, 2025

(54) SUSPENSION DEVICE, VEHICLE HEIGHT ADJUSTMENT DEVICE, AND SADDLE-RIDE TYPE VEHICLE

(71) Applicant: Hitachi Astemo, Ltd., Hitachinaka (JP)

(72) Inventors: Yosuke Fujikawa, Hitachinaka (JP); Yosuke Murakami, Hitachinaka (JP)

(73) Assignee: Hitachi-Astemo, Ltd., Hitachinaka (JP)

( * ) Notice: Subject to any disclaimer, the term of this patent is extended or adjusted under 35 U.S.C. 154(b) by 505 days.

(21) Appl. No.: 17/698,797

(22) Filed: Mar. 18, 2022

(65) Prior Publication Data

US 2022/0203792 A1 Jun. 30, 2022

Related U.S. Application Data

(63) Continuation of application No. PCT/JP2020/025033, filed on Jun. 25, 2020.

(51) Int. Cl.
| | | |
|---|---|---|
| *B60G 17/015* | (2006.01) | |
| *B60G 17/044* | (2006.01) | |
| *B60G 17/08* | (2006.01) | |
| *B62K 25/04* | (2006.01) | |
| *F16F 9/46* | (2006.01) | |
| *F16F 15/02* | (2006.01) | |

(52) U.S. Cl.
CPC ........ *B60G 17/015* (2013.01); *B60G 17/044* (2013.01); *B60G 17/08* (2013.01); *B62K 25/04* (2013.01); *F16F 9/46* (2013.01); *F16F 15/02* (2013.01)

(58) Field of Classification Search
CPC .... B60G 17/015; B60G 17/044; B60G 17/08; B62K 25/04; F16F 9/46; F16F 15/02
See application file for complete search history.

(56) References Cited

U.S. PATENT DOCUMENTS

| | | | | |
|---|---|---|---|---|
| 9,975,598 | B2 * | 5/2018 | Bender | B60G 11/58 |
| 2011/0101632 | A1 * | 5/2011 | Mochizuki | F16F 9/56 |
| | | | | 280/6.157 |
| 2014/0083093 | A1 * | 3/2014 | Murakami | B62K 25/02 |
| | | | | 60/459 |
| 2016/0272271 | A1 * | 9/2016 | Murakami | B60G 3/01 |
| 2017/0282996 | A1 * | 10/2017 | Murakami | B60G 17/018 |

FOREIGN PATENT DOCUMENTS

| | | |
|---|---|---|
| DE | 8506914 U1 | 12/1986 |
| JP | 2007030665 A * | 2/2007 |
| JP | 2010149550 A | 7/2010 |

(Continued)

OTHER PUBLICATIONS

JP-2007030665-A Machine English Translation (Year: 2007).*

(Continued)

*Primary Examiner* — Jason D Shanske
*Assistant Examiner* — Matthew James O'Neill
(74) *Attorney, Agent, or Firm* — Leason Ellis LLP; Edward J. Ellis; Melvin C. Garner

(57) ABSTRACT

A suspension device includes a spring, a jack, a reservoir chamber which reserves the oil, a first pump, a second pump an opening and closing unit. The second pump is configured to cause the oil to flow into the housing chamber and to cause the oil to flow out from the housing chamber.

7 Claims, 13 Drawing Sheets

(56) References Cited

FOREIGN PATENT DOCUMENTS

JP            2016160968 A  *  9/2016
JP            2016175555 A     10/2016

OTHER PUBLICATIONS

JP-2016160968-A Machine English Translation (Year: 2016).*
German Office Action dated Nov. 22, 2022 for the corresponding German Patent Application No. 112020003952.8 (7 pages including English translation).
International Search Report mailed Sep. 24, 2020 for the corresponding International Patent Application No. PCT/JP2020/025033, 5 pages [English translation attached].

* cited by examiner

SUSPENSION DEVICE, VEHICLE HEIGHT ADJUSTMENT DEVICE, AND SADDLE-RIDE TYPE VEHICLE

CROSS-REFERENCE TO RELATED APPLICATION(S)

This application is a Continuation of International Application No. PCT/JP2020/025033 filed on Jun. 25, 2020, the content of which is incorporated herein by reference in its entirety.

FIELD OF THE INVENTION

The present invention relates to a suspension device, a vehicle height adjustment device, and a saddle-ride type vehicle.

BACKGROUND OF THE INVENTION

In recent years, there has been proposed a device having a function of increasing a vehicle height while a vehicle is traveling and decreasing the vehicle height in order to facilitate getting on and off the vehicle while the vehicle is stopped.

For example, a device described in JP-A-2016-175555 includes a spring having one end supported on a vehicle body side and the other end supported on a wheel side, an adjustment unit having a housing chamber for housing liquid and adjusting a length of the spring in accordance with an amount of the liquid in the housing chamber, and a reservoir chamber for reserving the liquid. In addition, the device described in JP-A-2016-175555 includes a pump which includes a cylinder, sucks the liquid reserved in the reservoir chamber into the cylinder when a relative distance between a vehicle body and a wheel becomes large, and discharges the liquid in the cylinder when the relative distance between the vehicle body and the wheel becomes small. In addition, the device described in JP-A-2016-175555 includes a flow path switching unit which switches among a state in which the liquid discharged from the pump is guided into the housing chamber in order to increase the amount of the liquid in the housing chamber, a state in which the liquid in the housing chamber is guided into the reservoir chamber in order to decrease the amount of the liquid in the housing chamber, and a state in which the amount of the liquid in the housing chamber is maintained.

SUMMARY OF THE INVENTION

It is considered that the vehicle height is increased by supplying oil to a jack which supports a spring and adjusting the length of the spring by using an amplitude operation which occurs along with the traveling of the vehicle. In this case, the supply of the oil to the jack depends on the amplitude operation in the vehicle. For example, when the vehicle is traveling on a relatively flat road surface, the amount of oil supplied to the jack per unit time is small. As a result, the time required to set the vehicle height to a desired height may become longer.

An object of the present invention is to enable oil to be supplied to a jack by using an amplitude operation associated with traveling of a vehicle, and to enable a vehicle height to be increased or decreased in a time shorter than in the related art regardless of a state of a road surface.

One aspect of the present disclosure is a suspension device including: a spring which has a first end supported on a vehicle body side and a second end supported on a wheel side, the second end being an end portion opposite to the first end; a jack which supports the first end or the second end, includes a jack chamber housing oil, and adjusts a length of the spring in accordance with an amount of the oil in the jack chamber; a reservoir chamber which reserves the oil; a first pump which includes a cylinder, sucks the oil into the cylinder when a relative distance between the vehicle body and the wheel becomes large, and discharges the oil in the cylinder to the jack chamber when the relative distance becomes small; and a second pump configured to send the oil from the reservoir chamber to the jack chamber by being driven by a drive unit.

Here, the second pump may cause the oil to flow out from the jack chamber.

The suspension device further includes an opening and closing unit which has a housing chamber housing the oil, and opens and closes a flow path of oil between the jack chamber and the reservoir chamber in accordance with an amount of the oil in the housing chamber, in which the second pump may cause the oil to flow into the housing chamber and to cause the oil to flow out from the housing chamber.

Another aspect of the present disclosure is a vehicle height adjustment device including: a spring which has a first end supported on a vehicle body side and a second end supported on a wheel side, the second end being an end opposite to the first end; a jack which supports the first end or the second end, includes a jack chamber housing oil, and adjusts a length of the spring in accordance with an amount of the oil in the jack chamber; a reservoir chamber which reserves the oil; a first pump which includes a cylinder, sucks oil into the cylinder when a relative distance between the vehicle body and the wheel becomes large, and discharges the oil in the cylinder to the jack chamber when the relative distance becomes small; a second pump configured to send the oil from the reservoir chamber to the jack chamber by being driven by a drive unit; and a control unit configured to control driving of the drive unit.

Here, the control unit may drive the drive unit in accordance with information on a time of movement of the jack.

In addition, the control unit may drive the drive unit in accordance with information on a movement speed of a vehicle.

The vehicle height adjustment device further includes an opening and closing unit which has a housing chamber housing the oil, and opens and closes a flow path of the oil between the jack chamber and the reservoir chamber in accordance with an amount of the oil in the housing chamber, in which the control unit may stop the drive unit after the opening and closing unit opens the flow path by the second pump controlling the oil in the housing chamber.

Another aspect of the present disclosure is a saddle-ride type vehicle including: a vehicle body; wheels; a spring which has a first end supported on a vehicle body side and a second end supported on a wheel side, the second end being an end portion opposite to the first end; a jack which supports the first end or the second end, includes a jack chamber housing oil, and adjusts a length of the spring in accordance with an amount of the oil in the jack chamber; a reservoir chamber which reserves the oil; a first pump which includes a cylinder, sucks oil into the cylinder when a relative distance between the vehicle body and the wheel becomes large, and discharges the oil in the cylinder to the jack chamber when the relative distance becomes small; a second pump configured to send the oil from the reservoir chamber to the jack chamber by being driven by a drive unit; and a control unit configured to control driving of the drive unit.

According to the present invention, it is possible to supply oil to a jack by using an amplitude operation associated with traveling of a vehicle, and it is possible to increase or decrease a vehicle height in a time shorter than in the related art regardless of a state of a road surface.

DETAILED DESCRIPTION OF THE INVENTION

Hereinafter, embodiments of the present invention will be described in detail with reference to the accompanying drawings. Coils, cores, plungers, operating rods, and solenoids provided in a solenoid valve 91 and a solenoid valve 291, which will be described later, are not shown for convenience. The following embodiments are embodiments of the present invention, and the present invention is not limited to the following embodiments.

First Embodiment

Figure 1:
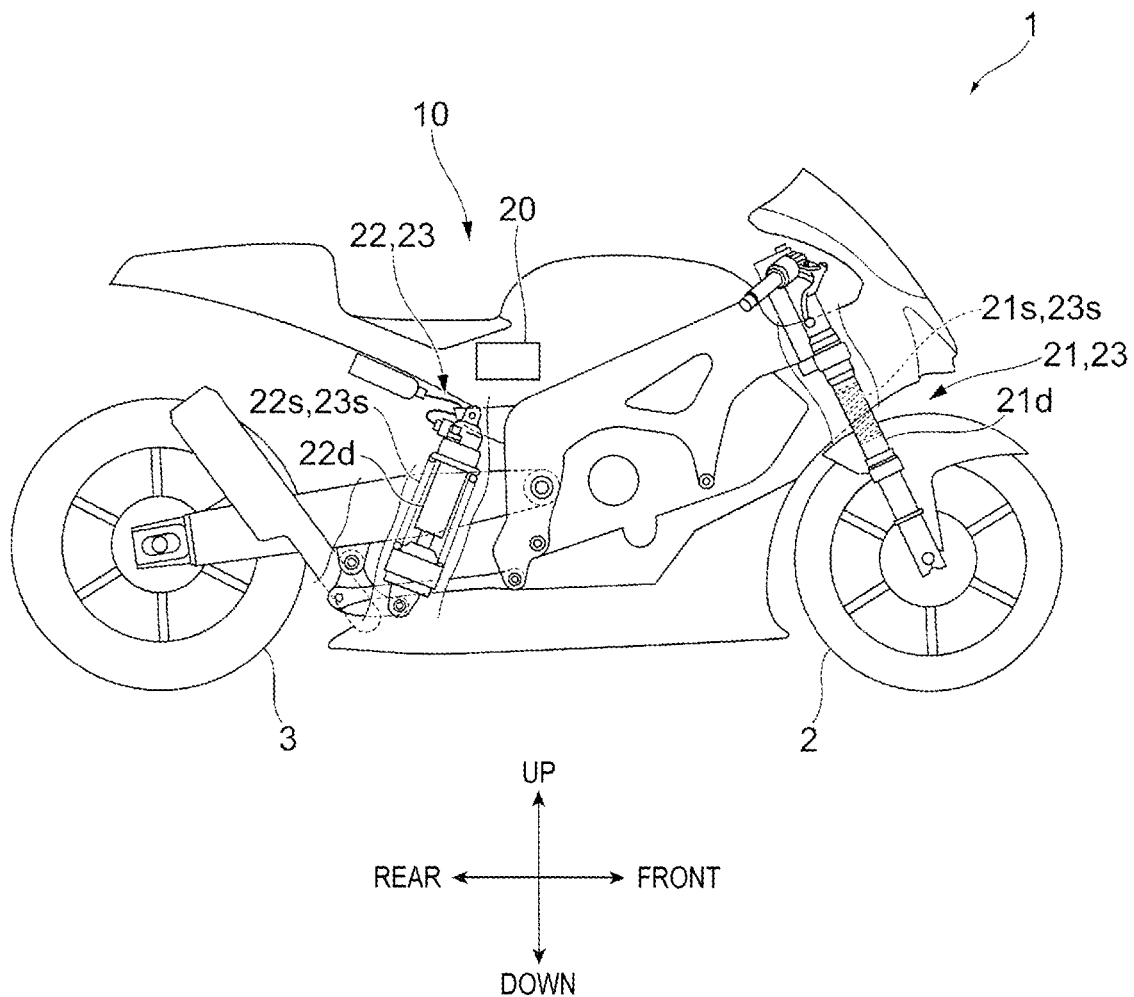
FIG. 1 is a diagram illustrating a schematic configuration of a motorcycle 1 according to a first embodiment.

FIG. 1 is a diagram illustrating a schematic configuration of a motorcycle 1 according to a first embodiment.

The motorcycle 1, which is an example of a saddle-ride type vehicle, includes a front wheel 2, which is a wheel on the front side, a rear wheel 3, which is a wheel on the rear side, and a vehicle body 10.

In addition, the motorcycle 1 also includes a front fork 21 which connects the front wheel 2 and the vehicle body 10. The front fork 21 includes a suspension spring 21s which absorbs an impact applied to the front wheel 2 from a road surface or the like, and a damping device 21d which damps vibration of the suspension spring 21s.

In addition, the motorcycle 1 includes one rear suspension 22 for connecting the rear wheel 3 and the vehicle body 10 on each of the left side and the right side of the rear wheel 3. The rear suspension 22 includes a suspension spring 22s which absorbs an impact applied to the rear wheel 3 from a road surface or the like, and a damping device 22d which damps vibration of the suspension spring 22s.

In the following description, the front fork 21 and the rear suspension 22 may be collectively referred to as a "suspension device 23". In addition, the suspension spring 21s and the suspension spring 22s may be collectively referred to as a "spring 23s". In addition, the front wheel 2 and the rear wheel 3 may be collectively referred to as "wheels", and the vehicle body 10 may be referred to as a "vehicle body".

In addition, the motorcycle 1 includes a control device 20, which is an example of a control unit, which controls a vehicle height, which is a height of a seat of the motorcycle 1, by controlling switching of a flow path of oil filled in the suspension device 23.

Figure 2:
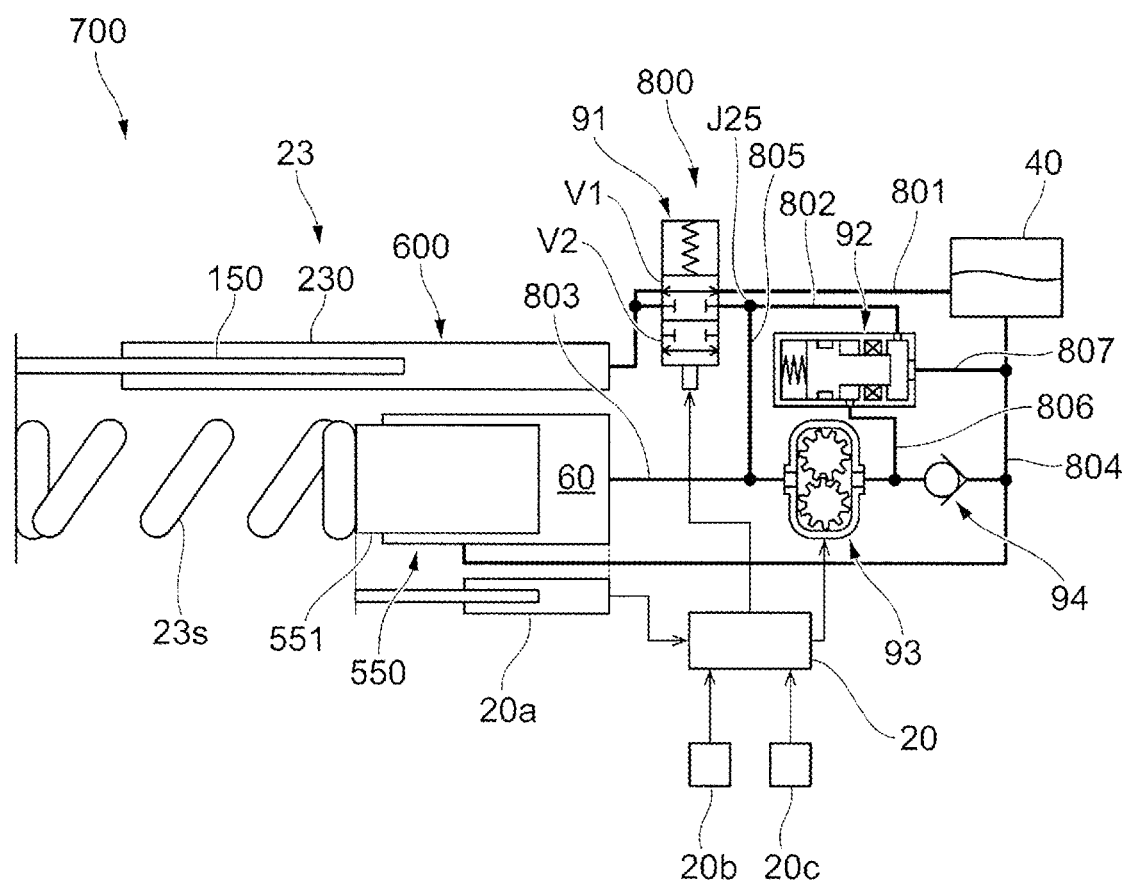
FIG. 2 is a diagram illustrating a schematic configuration of a vehicle height adjustment device 700 according to the first embodiment.

FIG. 2 is a diagram illustrating a schematic configuration of a vehicle height adjustment device 700 according to the first embodiment.

As illustrated in FIG. 2, the vehicle height adjustment device 700 includes the suspension device 23 and the control device 20.

The suspension device 23 includes the spring 23s having a first end supported on a vehicle body side and a second end supported on a wheel side, and the second end is an end portion opposite to the first end.

In addition, the suspension device 23 includes a jack 550 which includes a support portion 551 supporting the first end of the spring 23s and a jack chamber 60 housing the oil, and adjusts a length of the spring 23s by the support portion 551 moving in accordance with the amount of the oil in the jack chamber 60.

In addition, the suspension device 23 includes a reservoir chamber 40 which reserves oil.

In addition, the suspension device 23 includes a pump 600, which is an example of a first pump, including a rod 150 and a cylinder 230, sucking the oil into the cylinder 230 when a relative distance between the vehicle body and the wheel becomes large, and discharging the oil in the cylinder 230 when the relative distance between the vehicle body and the wheel becomes small. Hereinafter, a case where the relative distance between the vehicle body and the wheel becomes large may be referred to as "extension", and a case where the relative distance becomes small may be referred to as "compression".

In addition, the suspension device 23 includes a switching unit 800 which switches the flow path of the oil filled in the suspension device 23.

The jack 550, the support portion 551, the pump 600, the rod 150, and the cylinder 230 may be implemented by, for example, a spring length changing unit 250, an upper end portion support member 270, the pump 600, the rod 150, and the cylinder 230 described in JP-A-2016-175555 filed by the applicant of the present application.

The switching unit 800 includes the solenoid valve 91 which controls the flow of oil in the flow path, and a pilot valve 92 which is an example of an opening and closing unit which opens and closes the flow path in accordance with the inflowing oil. In addition, the switching unit 800 includes a gear pump 93, which is an example of a second pump which pumps oil, and a check valve 94 which allows a flow of oil in one direction and restricts a flow of oil in the opposite direction.

The switching unit 800 includes a first flow path 801 through which oil flows between the pump 600 and the reservoir chamber 40, and a second flow path 802 through which oil flows between the pump 600 and the pilot valve 92. In addition, the switching unit 800 includes a third flow path 803 through which oil flows between the jack chamber 60 and the gear pump 93, and a fourth flow path 804 through which oil flows between the reservoir chamber 40 and the gear pump 93.

The switching unit 800 further includes a fifth flow path 805 which is connected to the second flow path 802 and the third flow path 803 and through which oil flows. The second flow path 802 and the fifth flow path 805 are connected to each other at a connection portion J25.

In addition, the switching unit 800 includes a sixth flow path 806 through which oil flows between the pilot valve 92 and the fourth flow path 804. The sixth flow path 806 is connected between the gear pump 93 and the check valve 94 in the fourth flow path 804.

The switching unit 800 includes a seventh flow path 807 through which oil flows between the pilot valve 92 and the fourth flow path 804. The seventh flow path 807 is connected between the reservoir chamber 40 and the check valve 94 in the fourth flow path 804.

(Solenoid Valve 91)

The solenoid valve 91 includes a solenoid having the coil, the core disposed inside the coil, the plunger guided by the core, and the operating rod connected to the plunger. The solenoid causes the plunger to generate thrust in an axial direction such that an amount of protrusion of the operating rod from the case increases as an energizing current applied to the coil increases. An energizing amount of the solenoid valve 91 is controlled by the control device 20.

The solenoid valve 91 includes a first control valve V1 and a second control valve V2 which control the flow of oil in the first flow path 801 and the second flow path 802. The first control valve V1 is controlled to a state in which the first flow path 801 is opened and the second flow path 802 is closed. The second control valve V2 is controlled to a state in which the first flow path 801 is closed and the second flow path 802 is opened. The solenoid valve 91 is in a state in which the flow of oil is controlled by one of the first control valve V1 and the second control valve V2 in accordance with the energizing amount. When the energization of the solenoid is stopped, the solenoid valve 91 is in a state in which the flow of oil is controlled by the first control valve V1.

(Pilot Valve 92)

Figure 3:
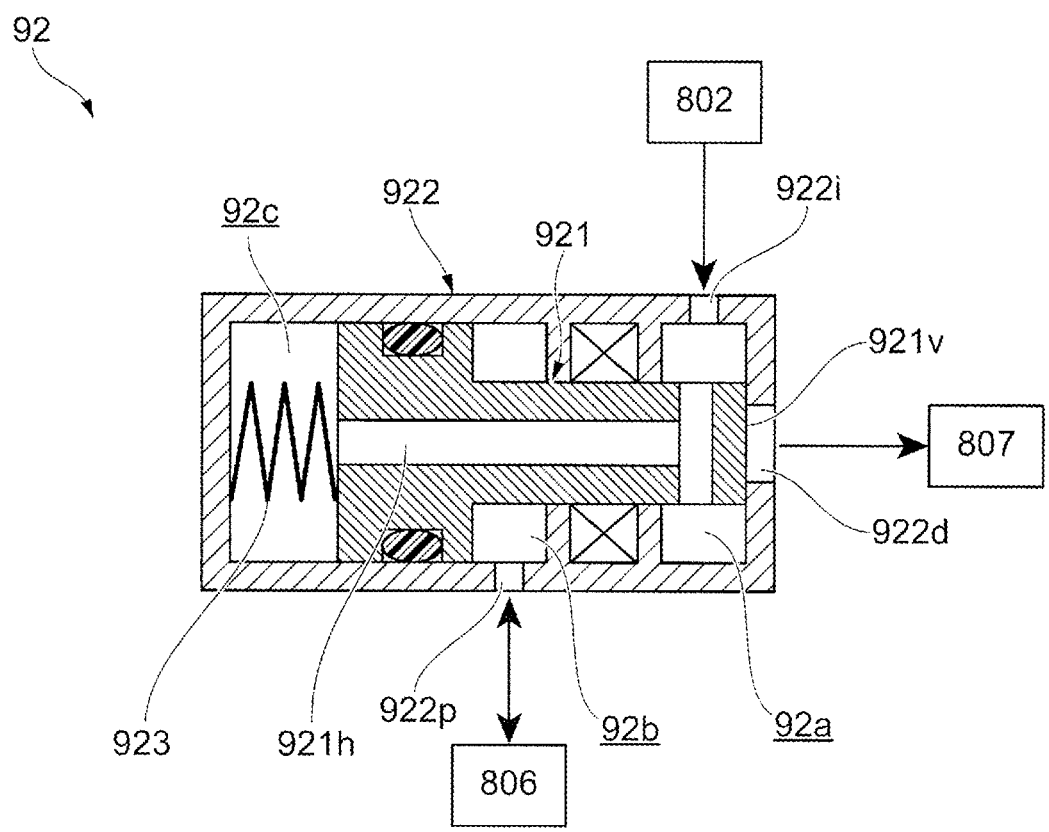
FIG. 3 is a cross-sectional view of a pilot valve 92.

FIG. 3 is a cross-sectional view of the pilot valve 92.

As illustrated in FIG. 3, the pilot valve 92 includes a moving portion 921 which is moving, a holding portion 922 which movably holds the moving portion 921, and a spring 923 which applies a force to the moving portion 921.

The holding portion 922 includes a first chamber 92a into which oil flows and from which oil flows to the outside. In addition, the holding portion 922 includes an inflow portion 922i which is connected to the second flow path 802 and through which the oil flowing in from the second flow path 802 flows, and an outflow portion 922d which is connected to the seventh flow path 807 and through which the oil flowing out from the first chamber 92a flows.

The holding portion 922 includes a second chamber 92b, which is an example of a housing chamber which moves the moving portion 921 in accordance with the amount of oil inside the holding portion 922. In addition, the holding portion 922 has an opening portion 922p communicating with the second chamber 92b. The opening portion 922p communicates with the sixth flow path 806.

Further, the holding portion 922 has a third chamber 92c for housing the spring 923.

The moving portion 921 has a closing portion 921v on a side facing the outflow portion 922d. The closing portion 921v closes the outflow portion 922d when the moving portion 921 is located at a position closest to the outflow portion 922d. On the other hand, the closing portion 921v opens the outflow portion 922d when the closing portion 921v is located at a position away from the outflow portion 922d.

Further, the moving portion 921 has a through hole 921h which is a hole penetrating the moving portion 921. The through hole 921h connects the first chamber 92a and the third chamber 92c. Accordingly, the moving portion 921 does not move due to the influence of a pressure of the oil flowing through the first chamber 92a.

The spring 923 applies a force to the moving portion 921 in a direction in which the moving portion 921 approaches the outflow portion 922d.

The pilot valve 92 moves the moving portion 921 in accordance with the amount of the oil flowing into the second chamber 92b. In the pilot valve 92, when the amount of the oil in the second chamber 92b is increased by the gear pump 93, the moving portion 921 moves so as to open the outflow portion 922d. In addition, in the pilot valve 92, when the amount of the oil in the second chamber 92b is decreased by the gear pump 93, the moving portion 921 moves so as to close the outflow portion 922d.

(Gear Pump 93)

Figure 4:
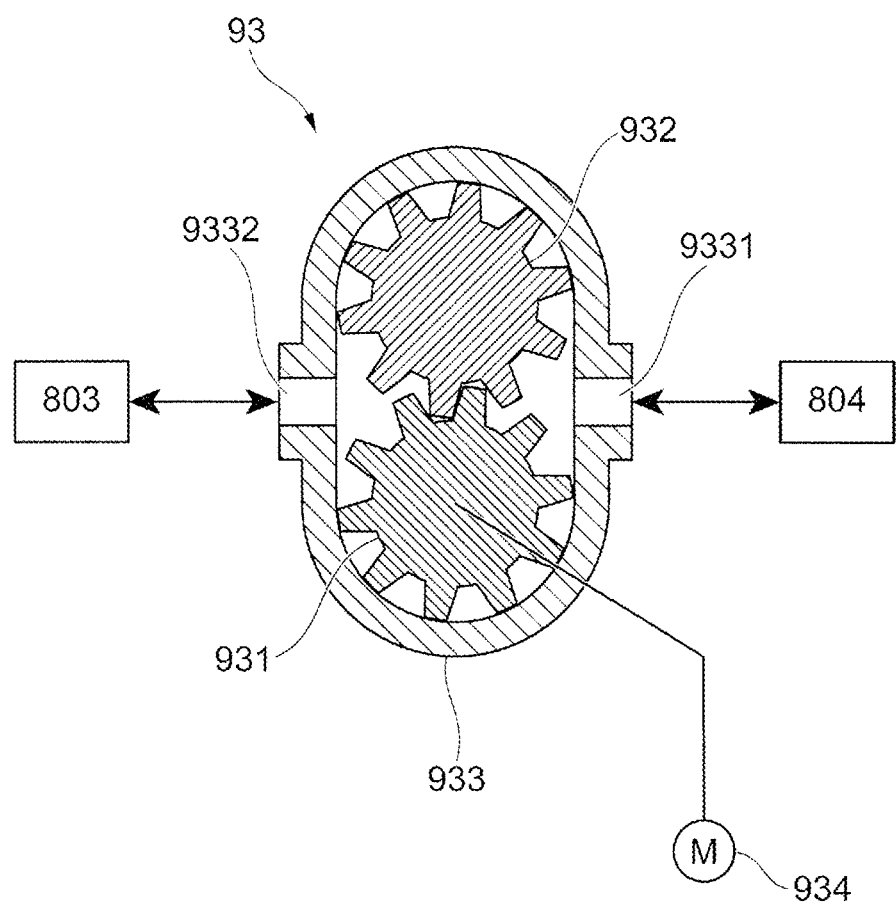
FIG. 4 is a cross-sectional view of a gear pump 93.

FIG. 4 is a cross-sectional view of the gear pump 93.

As illustrated in FIG. 4, the gear pump 93 includes a first gear 931 and a second gear 932 which meshes with the first gear 931 and rotates in accordance with the rotation of the first gear 931. In addition, the gear pump 93 includes a housing body 933 which rotatably supports the first gear 931 and the second gear 932, respectively, and houses the first gear 931 and the second gear 932. The gear pump 93 further includes a motor 934, which is an example of a drive unit which drives the first gear 931.

The first gear 931 is rotated by being driven by the motor 934. The second gear 932 is driven by the first gear 931. A rotation direction of the first gear 931 is switched in accordance with a driving direction of the motor 934. The rotation direction of the second gear 932 is switched in accordance with the first gear 931.

The housing body 933 has a first opening portion 9331 and a second opening portion 9332, which are parts of a flow path of oil flowing inside and outside the housing body 933. The first opening portion 9331 is connected to the fourth flow path 804. In addition, the second opening portion 9332 is connected to the third flow path 803.

The gear pump 93 causes the first gear 931 to rotate in a first direction, thereby causing the second gear 932 to rotate, causing the oil to flow into the housing body 933 from the first opening portion 9331, and causing the compressed oil to flow out from the second opening portion 9332.

On the other hand, the gear pump 93 causes the first gear 931 to rotate in a second direction opposite to the first direction, thereby causing the second gear 932 to rotate, causing the oil to flow into the housing body 933 from the second opening portion 9332, and causing the compressed oil to flow out from the first opening portion 9331.

(Check Valve 94)

As illustrated in FIG. 2, the check valve 94 allows the oil to flow from the reservoir chamber 40 to the gear pump 93 in the fourth flow path 804. On the other hand, the check valve 94 restricts the flow of the oil from the gear pump 93 to the reservoir chamber 40 in the fourth flow path 804.

With the above configuration, the switching unit 800 of the first embodiment switches among a first state, a second state, a third state, and a fourth state, respectively, as an oil flowing state. The first state is a state in which the oil flows from the pump 600 and the reservoir chamber 40 to the jack chamber 60. The second state is a state in which the oil flows only between the pump 600 and the reservoir chamber 40. The third state is a state in which the oil flows only between the pump 600 and the jack chamber 60. The fourth state is a state in which the oil flows from the jack chamber 60 to the reservoir chamber 40.

The control device 20 controls the operations of the solenoid valve 91 and the gear pump 93 to control the switching among the first state to the fourth state. The control device 20 includes a CPU, a ROM in which programs to be executed by the CPU, various data, or the like are stored, and a RAM used as a working memory or the like of the CPU. Output values from a detection unit 20a which detects a movement amount of the support portion 551 of the jack 550, a detection unit 20b which detects a vehicle speed Vc which is a movement speed of the motorcycle 1, or the like are input to the control device 20.

In addition, the motorcycle 1 includes a switch 20c for allowing a user to select a setting of hardness of the suspension device 23. Then, information on the hardness selected by the user is input to the control device 20 via the switch 20c. The switch 20c receives, from the user, a selection of one of a setting in which the suspension device 23 is relatively hard and a setting in which the suspension device 23 is relatively soft.

The control device 20 controls the operations of the solenoid valve 91 and the gear pump 93 in accordance with the movement amount of the support portion 551, the vehicle speed Vc, and the setting of the hardness selected by the user via the switch 20c.

(First State)

Figure 5:
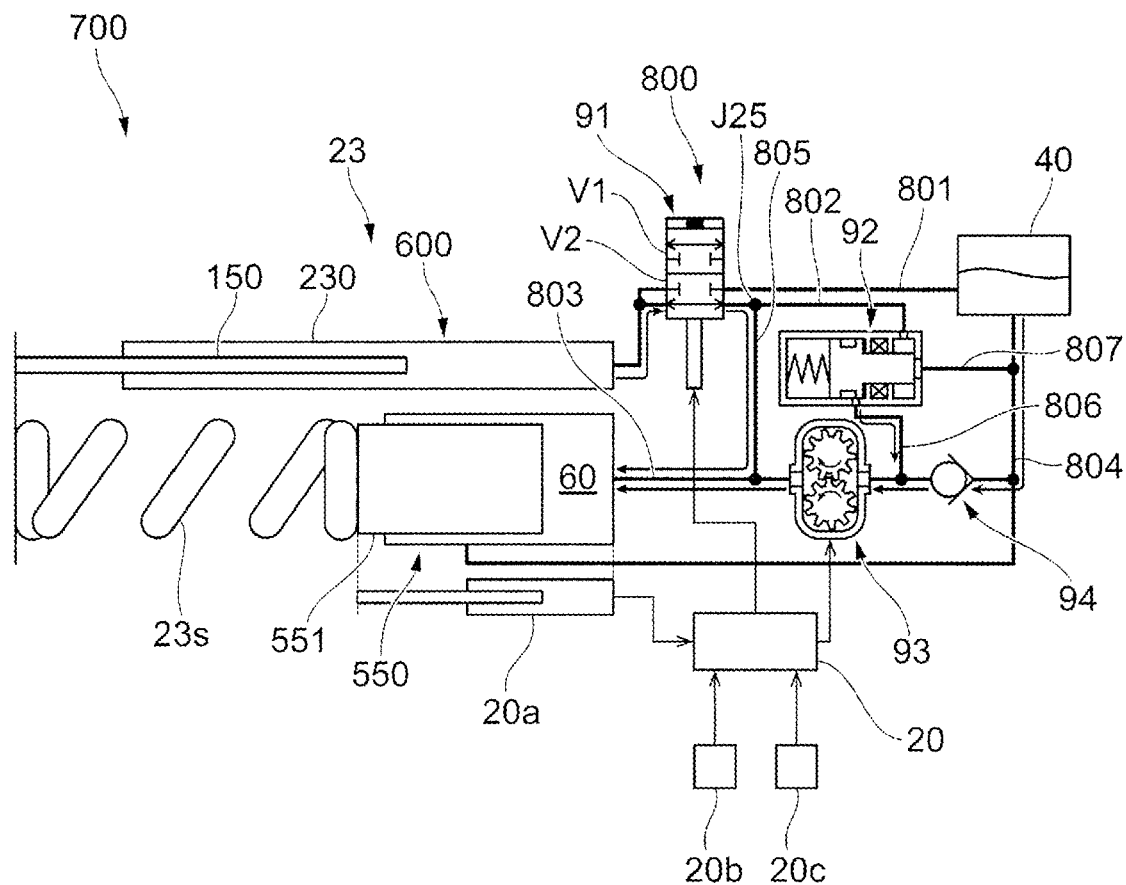
FIG. 5 is a diagram illustrating a flow state of oil in a first state.

FIG. 5 is a diagram illustrating a flow state of oil in the first state.

As shown in FIG. 5, in the first state, the solenoid valve 91 is controlled by the second control valve V2 to a state in which the first flow path 801 is closed and the second flow path 802 is opened. Further, in the gear pump 93, the motor 934 rotates the first gear 931 in the first direction.

By rotating the first gear 931 of the gear pump 93 in the first direction, the oil flowing from the reservoir chamber 40 into the fourth flow path 804 opens the check valve 94 and flows into the gear pump 93. Further, the oil which has passed through the gear pump 93 flows into the jack chamber 60 through the third flow path 803.

In the first state, the oil in the second chamber 92b of the pilot valve 92 flows out through the sixth flow path 806, and the closing portion 921v of the pilot valve 92 closes the outflow portion 922d (see FIG. 3).

In addition, the pump 600 discharges the oil in the cylinder 230 during compression. The oil discharged by the pump 600 flows into the jack chamber 60 through the second flow path 802, the fifth flow path 805, and the third flow path 803.

As described above, in the first state, the oil is supplied from both the pump 600 and the reservoir chamber 40 to the jack chamber 60. As the amount of the oil in the jack chamber 60 increases, the support portion 551 of the jack 550 moves to the spring 23s side, and the length of the spring 23s decreases. Accordingly, a force with which the spring 23s presses the support portion 551 is larger than that before the support portion 551 moves to the spring 23s side. As a result, the vehicle height of the motorcycle 1 is higher than that before the support portion 551 moves to the spring 23s side. In the first state, the vehicle height adjustment device 700 causes the oil to flow into the jack chamber 60 by using the pump 600 and the gear pump 93. Accordingly, the amount of the oil flowing into the jack chamber 60 per unit time can be increased as compared with the case of using only the pump 600, and thus the vehicle height of the motorcycle 1 can be increased in a short time regardless of the state of the road surface.

(Second State)

Figure 6:
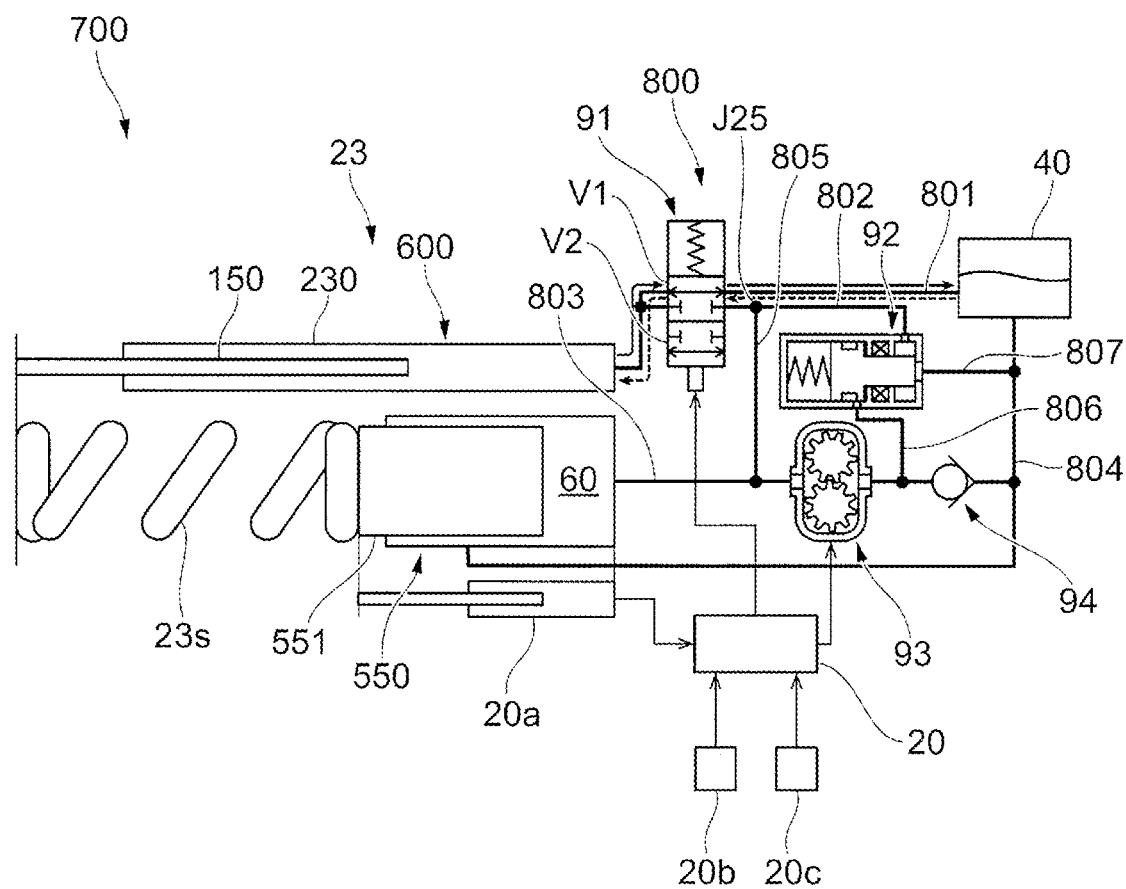
FIG. 6 is a diagram illustrating a flow state of oil in a second state.

FIG. 6 is a diagram showing a flow state of oil in the second state.

As shown in FIG. 6, in the second state, the solenoid valve 91 is controlled by the first control valve V1 to a state in which the first flow path 801 is opened and the second flow path 802 between the pump 600 and the connection portion J25 is closed. In the second state, the motor 934 is not driven and the gear pump 93 is stopped.

In the second state, the pump 600 sucks the oil reserved in the reservoir chamber 40 into the cylinder 230 at the time of extension, and discharges the oil in the cylinder 230 to the reservoir chamber 40 at the time of compression.

The pilot valve 92 blocks the flow of the oil in the second flow path 802 and the seventh flow path 807. In addition, the check valve 94 restricts the flow of the oil toward the reservoir chamber 40 in the fourth flow path 804. Therefore, the oil does not flow out from the inside of the jack chamber 60, and the amount of the oil in the jack chamber 60 does not increase or decrease. Therefore, the vehicle height of the motorcycle 1 is maintained.

(Third State)

Figure 7:
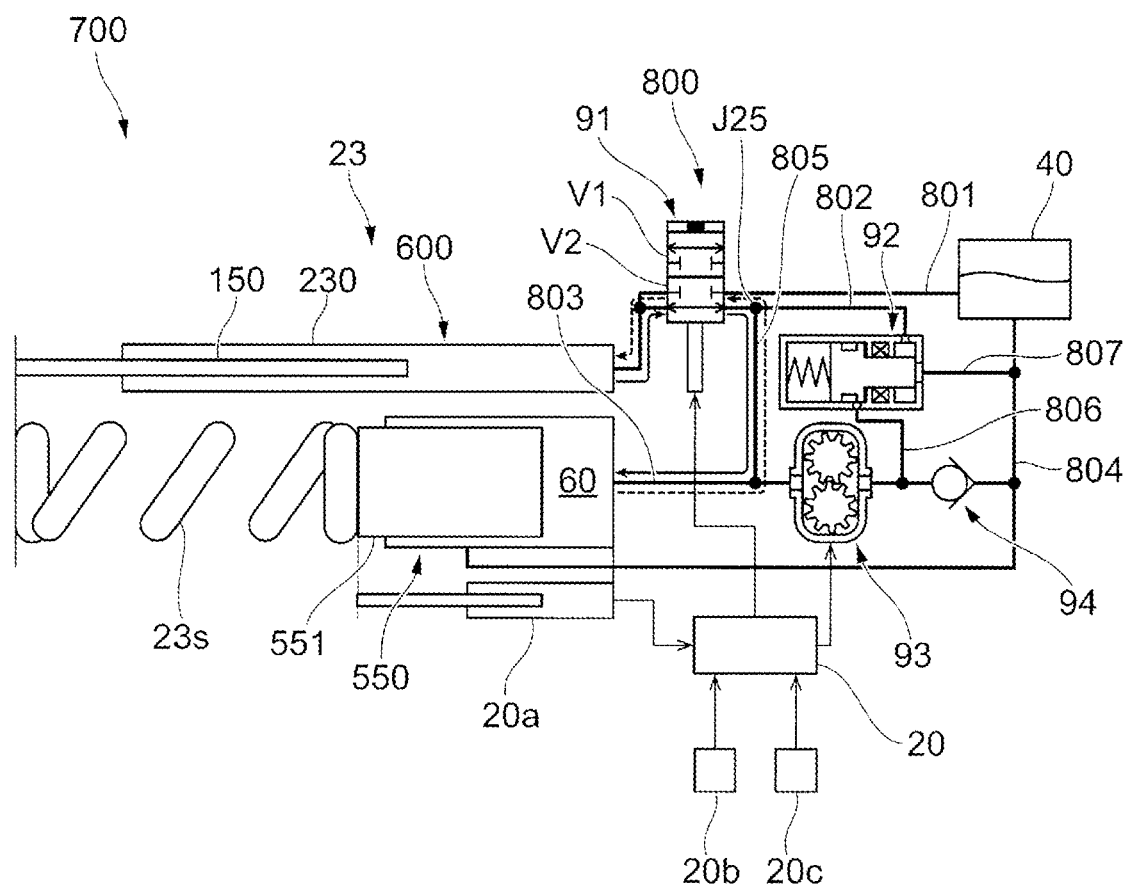
FIG. 7 is a diagram illustrating a flow state of oil in a third state.

FIG. 7 is a diagram showing a flow state of oil in the third state.

As shown in FIG. 7, in the third state, the solenoid valve 91 is controlled by the second control valve V2 to a state in which the first flow path 801 is closed and the second flow path 802 is opened. In the third state, the motor 934 is not driven and the gear pump 93 is stopped.

Here, the pilot valve 92 blocks the flow of the oil in the second flow path 802 and the seventh flow path 807. In addition, the check valve 94 restricts the flow of the oil toward the reservoir chamber 40 in the fourth flow path 804.

In the third state, the pump 600 sucks the oil reserved in the jack chamber 60 into the cylinder 230 at the time of extension, and discharges the oil in the cylinder 230 to the jack chamber 60 at the time of compression. When one cycle including extension and compression of the suspension device 23 ends, the amount of the oil in the jack chamber 60 does not increase or decrease, and thus the vehicle height is maintained.

(Fourth State)

Figure 8:
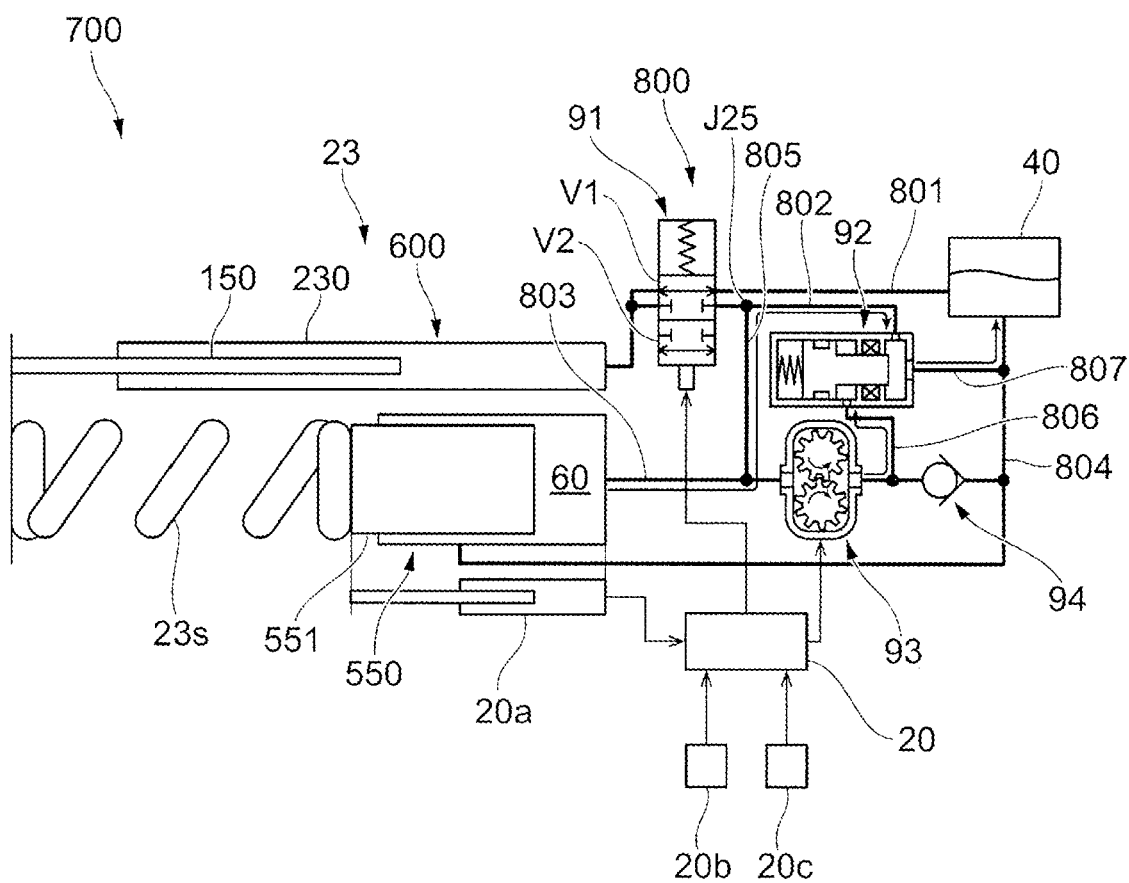
FIG. 8 is a diagram illustrating a flow state of oil in a fourth state.

FIG. 8 is a diagram showing a flow state of oil in the fourth state.

As shown in FIG. 8, in the fourth state, the solenoid valve 91 is controlled by the first control valve V1 to a state in which the first flow path 801 is opened and the second flow path 802 between the pump 600 and the connection portion J25 is closed. Further, the gear pump 93 causes the motor 934 to reversely rotate the first gear 931 in the second direction opposite to that of the first state. The gear pump 93 causes the motor 934 to reversely rotate the first gear 931 for a certain period of time, and then stops driving the motor 934. Here, as described later, the certain period of time for reversely rotating the motor 934 is set based on a time required for the closing portion 922v to open the outflow portion 922d by the gear pump 93 causing the oil to flow into the second chamber 92b (see FIG. 3) of the pilot valve 92.

In the fourth state, the pump 600 sucks the oil reserved in the reservoir chamber 40 into the cylinder 230 at the time of extension, and discharges the oil in the cylinder 230 to the reservoir chamber 40 at the time of compression.

In addition, in the fourth state, when the first gear 931 of the gear pump 93 reversely rotates, the oil in the jack chamber 60 flows out through the third flow path 803. Accordingly, in the fourth state, the vehicle height adjustment device 700 actively causes the oil in the jack chamber 60 to flow out by using the gear pump 93. Therefore, the vehicle height adjustment device 700 can cause the oil in the jack chamber 60 to flow out in a shorter time than in a case where the gear pump 93 is not used.

In addition, the gear pump 93 causes the oil to flow into the second chamber 92b (see FIG. 3) of the pilot valve 92 via the sixth flow path 806 by the reverse rotation of the first gear 931. As the amount of the oil in the second chamber 92b increases, the moving portion 921 moves, and the closing portion 921v opens the outflow portion 922d. Thereafter, the motor 934 of the gear pump 93 is stopped. Here, the sixth flow path 806 connects the second chamber 92b to a portion between the gear pump 93 and the check valve 94. When the motor 934 is stopped, the gear pump 93 is not rotated by a holding force due to excitation. Therefore, the oil in the second chamber 92b does not flow out through the sixth flow path 806. Accordingly, even in a state in which the gear pump 93 is not driven, the open state of the outflow portion 922d of the pilot valve 92 is maintained.

In the fourth state, the jack 550 attempts to be compressed by a weight of the vehicle body 10 being applied via the spring 23s. The oil reserved in the jack chamber 60 flows into the reservoir chamber 40 through the third flow path 803, the fifth flow path 805, the second flow path 802, the seventh flow path 807, and the fourth flow path 804. Accordingly, the amount of the oil in the jack chamber 60 decreases.

As described above, in the fourth state, when the oil flows from the jack chamber 60 to the reservoir chamber 40, the motor 934 of the gear pump 93 is stopped. Therefore, power consumption by the motor 934 is reduced as compared with a case where the motor 934 is continuously driven.

As the amount of the oil in the jack chamber 60 decreases, the support portion 551 of the jack 550 moves to the side opposite to the spring 23s, and the length of the spring 23s increases. Accordingly, a spring force of the spring 23s pressing the support portion 551 is smaller than that before the support portion 551 is moved. As a result, the vehicle height of the motorcycle 1 is lower than that before the support portion 551 moves to the side opposite to the spring 23s. In the fourth state, the vehicle height adjustment device 700 uses the gear pump 93 to cause the oil to flow out from the jack chamber 60 and cause the oil to flow into the reservoir chamber 40. Accordingly, the amount of the oil flowing out from the jack chamber 60 per unit time can be increased as compared with a case where the gear pump 93 is not used, and thus the vehicle height of the motorcycle 1 can be reduced in a short time regardless of the state of the road surface.

(Difference Between Second State and Third State)

In the second state, the support portion 551 does not swing, and the rod 150 swings. On the other hand, in the third state, the rod 150 and the support portion 551 swing. Accordingly, a difference generates between a force generated in the entire suspension device 23 in the second state and a force generated in the entire suspension device 23 in the third state, and the force generated in the entire suspension device 23 in the third state is larger than the force generated in the entire suspension device 23 in the second state.

Therefore, an impact force transmitted to the vehicle body 10 in the third state is larger than that in the second state. Similarly, a force pressing the wheel against the road surface is larger in the third state than that in the second state.

(Switching Control)

When the vehicle speed Vc detected by the detection unit 20b is lower than a predetermined increasing vehicle speed Vu after the motorcycle 1 starts to travel, the control device 20 sets the state to an initial state, which will be described later, and when the vehicle speed Vc becomes equal to or higher than the increasing vehicle speed Vu from the state in which the vehicle speed Vc is lower than the increasing vehicle speed Vu, the control device 20 sets the state to a first state. Thereafter, when the vehicle speed Vc is equal to or higher than the increasing vehicle speed Vu, the state is controlled to the first state until the movement amount of the support portion 551 of the jack 550 reaches a target movement amount on the maximum side. On the other hand, when the vehicle speed Vc of the motorcycle 1 becomes equal to or lower than a predetermined decreasing vehicle speed Vd from a state in which the motorcycle 1 is traveling at the increasing vehicle speed Vu or higher, the control device 20 controls the state to the fourth state until the movement amount of the support portion 551 becomes a target movement amount on the minimum side.

When the vehicle speed Vc is equal to or higher than the increasing vehicle speed Vu, the control device 20 switches the state in accordance with the setting of the hardness selected by the user via the switch 20c after the movement amount of the support portion 551 reaches the target movement amount on the maximum side. The control device 20 controls the state to the second state when the user selects a setting in which the hardness is relatively soft, and controls the state to the third state when the user selects a setting in which the hardness is relatively hard.

The increasing vehicle speed Vu may be 10 km/h, and the decreasing vehicle speed Vd may be 8 km/h, for example. In addition, the target movement amount on the maximum side may be 100 (mm), and the target movement amount on the minimum side may be 0 (mm), for example. The target movement amount may be changed by the selection of the user. In addition, the initial state may be, for example, any one of the second state to the fourth state other than the first state in which the vehicle height increases.

The control device 20 stores the state of the switching state by turning on any one of an initial flag, a first flag, a second flag, a third flag, and a fourth flag in the setting of the flag set in the RAM (hereinafter, may be referred to as a "flag setting"). The initial flag, the first flag, the second flag, the third flag, and the fourth flag are flags which are set in the initial state, the first state, the second state, the third state, and the fourth state, respectively.

In addition, when the vehicle height in the first state is increased, the control device 20 can control a time until the movement amount of the support portion 551 of the jack 550 reaches the target movement amount. As described above, unlike the pump 600, the gear pump 93 can supply oil to the jack chamber 60 without depending on the amplitude of the suspension device 23. In addition, the gear pump 93 can increase or decrease a flow rate of the oil to be pumped in accordance with a rotation speed of the first gear 931 by the motor 934.

The control device 20 receives a setting of a predetermined time (for example, 30 seconds) as the time required for the target movement amount to be reached after the switching unit 800 is switched to the first state. In this case, the control device 20 calculates the movement speed of the support portion 551 of the jack 550 based on the movement amount in the first period after the switching unit 800 is switched to the first state and the time taken until the movement amount is reached. When the movement speed is slower than a predetermined speed, the rotation speed of the motor 934 in the gear pump 93 is increased. On the other hand, when the movement speed in the first period is faster than the predetermined speed, the rotation speed of the motor 934 in the gear pump 93 is decreased.

The power consumption of the gear pump 93 increases in proportion to the rotational speed of the motor 934. Therefore, power saving can be achieved by controlling the motor 934 of the gear pump 93 in accordance with the supply of the oil by the pump 600.

Next, a procedure of switching control processing performed by the control device 20 will be described with reference to a flowchart.

Figure 9:
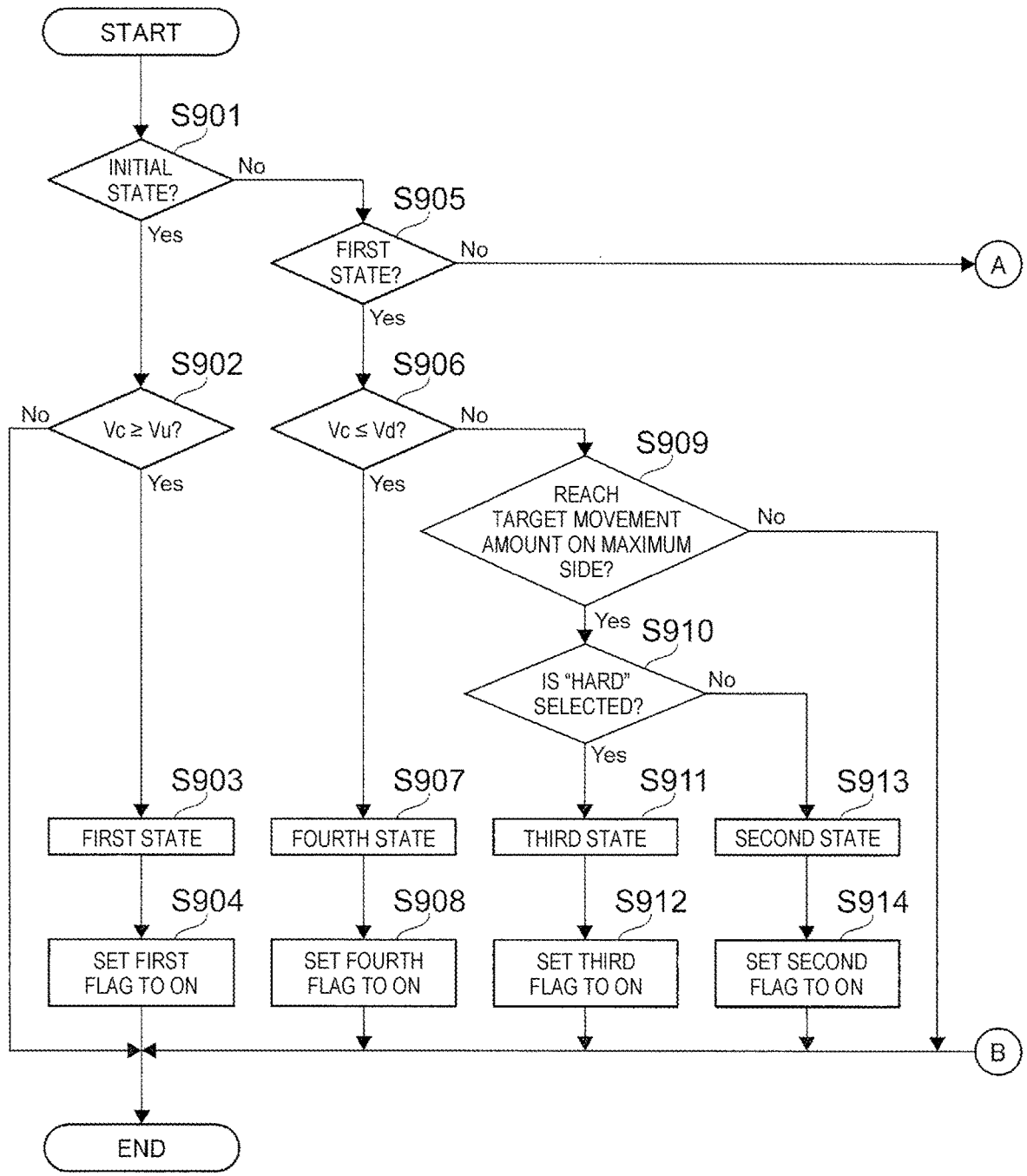
FIG. 9 is a flowchart illustrating a procedure of switching control processing performed by a control device 20.
Figure 10:
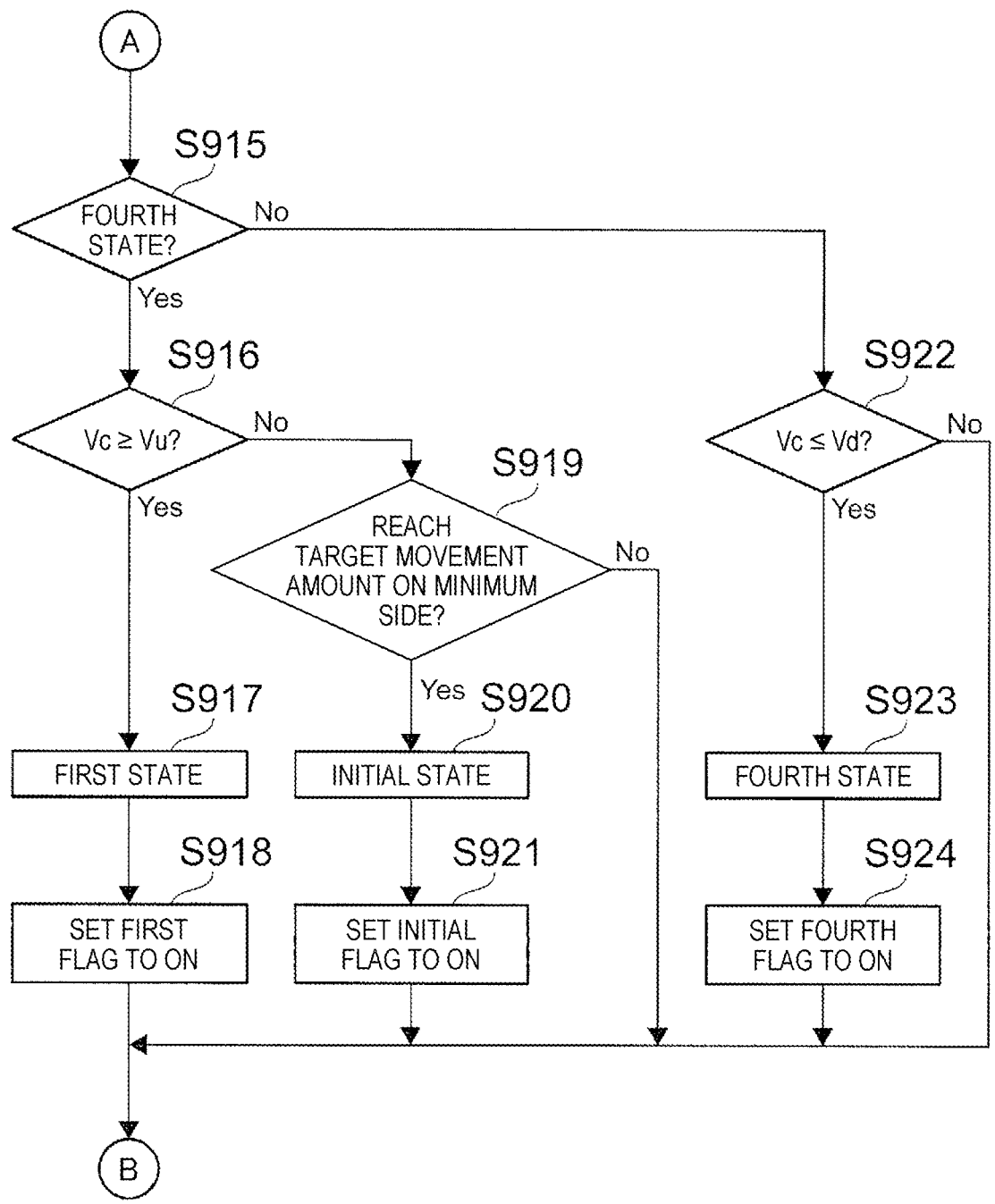
FIG. 10 is a flowchart illustrating a procedure of the switching control processing performed by the control device 20.

FIGS. 9 and 10 are flowcharts showing the procedure of the switching control processing performed by the control device 20.

The control device 20 repeatedly executes the switching control processing every predetermined period (for example, 1 millisecond).

The control device 20 determines whether the state is the initial state (S901). This is processing in which the control device 20 determines by confirming whether the initial flag is ON in the flag setting. The initial flag is a flag which is set to ON in S921, which will be described later. When the state is the initial state (Yes in S901), the control device 20 determines whether the vehicle speed Vc is equal to or higher than the increasing vehicle speed Vu (S902). When the vehicle speed Vc is equal to or higher than the increasing vehicle speed Vu (Yes in S902), the control device 20 switches to the first state so as to increase the vehicle height (S903). Thereafter, the control device 20 sets the first flag to ON (S904). On the other hand, when the vehicle speed Vc is not equal to or higher than the increasing vehicle speed Vu (No in S902), the control device 20 ends the processing.

When the state is not the initial state (No in S901), the control device 20 determines whether the state is the first state (S905). This is processing in which the control device 20 determines by confirming whether the first flag is ON in the flag setting. The first flag is a flag which is set to ON in S904 or S918 described later. In the first state (Yes in S905), the control device 20 determines whether the vehicle speed Vc is equal to or lower than the decreasing vehicle speed Vd (S906). When the vehicle speed Vc is equal to or lower than the decreasing vehicle speed Vd (Yes in S906), the control device 20 switches to the fourth state so as to lower the vehicle height (S907). Thereafter, the control device 20 sets the fourth flag to ON (S908).

When the vehicle speed Vc is not equal to or lower than the decreasing vehicle speed Vd (No in S906), the control device 20 determines whether the movement amount of the support portion 551 has reached the target movement amount on the maximum side (S909). When the movement amount is not the target movement amount (No in S909), the control device 20 ends the processing. On the other hand, when the movement amount has reached the target movement amount (Yes in S909), the control device 20 determines whether a setting in which the hardness is relatively hard is selected by the user via the switch 20c (S910). When the setting in which the hardness is relatively hard is selected (Yes in S910), the control device 20 switches to the third state so as to maintain the vehicle height and set the suspension device 23 to the setting in which the hardness is relatively hard (S911). Thereafter, the control device 20 sets the third flag to ON (S912). On the other hand, when the setting in which the hardness is relatively hard is not selected (No in S910), since the setting in which the hardness is relatively soft is selected, the control device 20 switches to the second state so as to maintain the vehicle height and set the suspension device 23 to the setting in which the hardness is relatively soft (S913). Thereafter, the control device 20 sets the second flag to ON (S914).

When the state is not the first state (No in S905), it is determined whether the state is the fourth state (S915). This is processing in which the control device 20 determines by confirming whether the fourth flag is ON in the flag setting. The fourth flag is a flag which is set to ON in S908 or S924 described later. When the state is the fourth state (Yes in S915), the control device 20 determines whether the vehicle speed Vc is equal to or higher than the increasing vehicle speed Vu (S916). When the vehicle speed Vc is equal to or higher than the increasing vehicle speed Vu (Yes in S916), the control device 20 switches to the first state so as to increase the vehicle height (S917), and sets the first flag to ON (S918).

When the vehicle speed Vc is not equal to or higher than the increasing vehicle speed Vu (No in S916), the control device 20 determines whether the movement amount of the support portion 551 has reached the target movement amount on the minimum side (S919). When the movement amount is not the target movement amount (No in S919), the control device 20 ends the processing. On the other hand, when the movement amount has reached the target movement amount (Yes in S919), the control device 20 switches to the initial state (S920), and sets the initial flag to ON (S921).

When the state is not the fourth state (No in S915), the state is the second state or the third state, and thus it is determined whether the vehicle speed Vc is equal to or lower than the decreasing vehicle speed Vd (S922). When the vehicle speed Vc is equal to or lower than the decreasing vehicle speed Vd (Yes in S922), the control device 20 switches to the fourth state so as to lower the vehicle height (S923), and sets the fourth flag to ON (S924). On the other hand, when the vehicle speed Vc is not equal to or lower than the decreasing vehicle speed Vd (No in S922), the control device 20 ends the processing.

In the vehicle height adjustment device 700 configured as described above, when the flow path of the oil is switched to the first state, the oil is supplied from the pump 600 and the reservoir chamber 40 to the jack chamber 60. Here, the vehicle height adjustment device 700 supplies the oil to the jack chamber 60 by the pump 600 by using the amplitude operation associated with the traveling of the motorcycle 1. Accordingly, it is possible to achieve power saving as compared with a case where the oil is supplied to the jack chamber 60 without using the amplitude operation associated with the traveling of the motorcycle 1.

Further, the vehicle height adjustment device 700 also supplies the oil to the jack chamber 60 by the gear pump 93. That is, the gear pump 93 assists the supply of the oil to the jack chamber 60, for example. Then, for example, when the motorcycle 1 travels on a relatively flat road surface and the amplitude of the pump 600 is small, the amount of the oil supplied to the jack chamber 60 by the pump 600 may be small. Even in such a case, the vehicle height adjustment device 700 can supply the oil to the jack chamber 60 by using the pump 600 and the gear pump 93 in combination. Accordingly, the vehicle height adjustment device 700 can increase the vehicle height in a shorter time than in the related art regardless of the state of the road surface.

In addition, the vehicle height adjustment device 700 uses the gear pump 93 in the fourth state in which the vehicle height is lowered. Accordingly, the vehicle height can be reduced in a shorter time than in the related art regardless of the state of the road surface.

Second Embodiment

Figure 11:
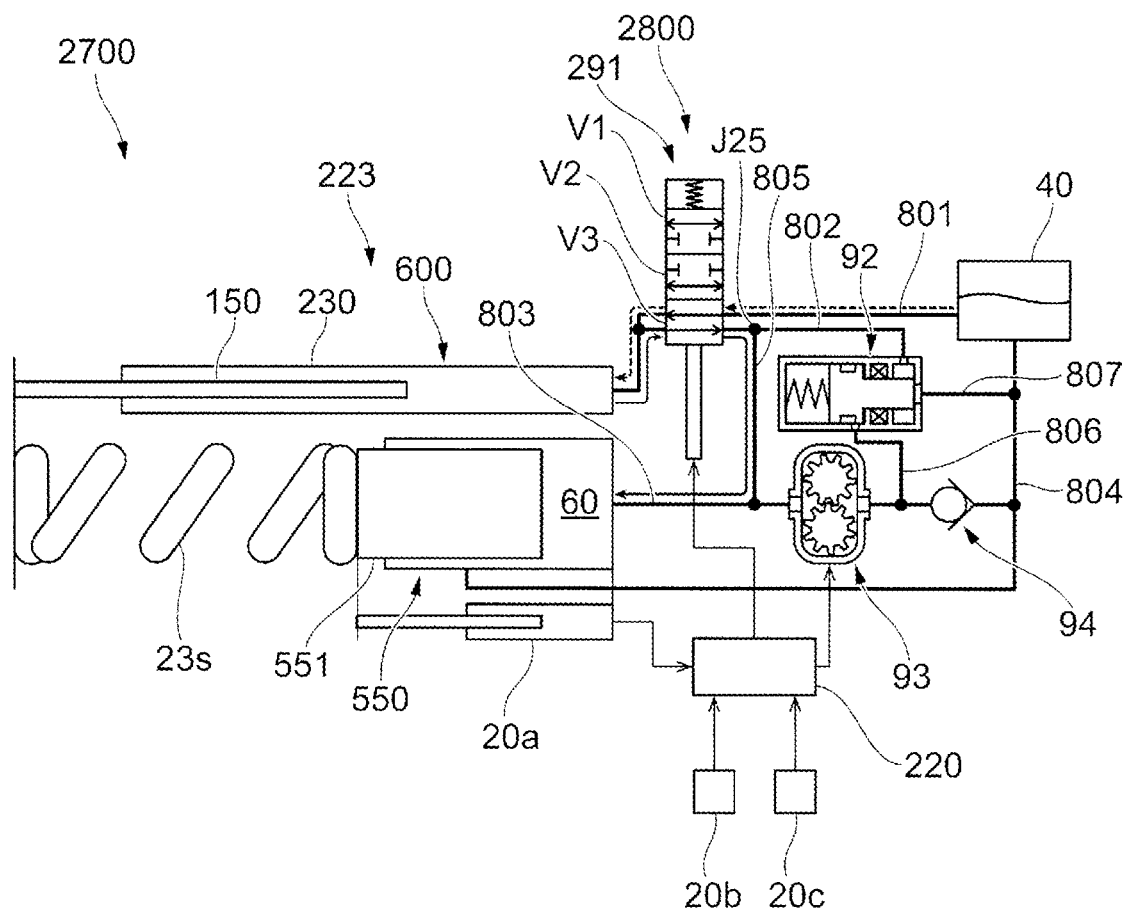
FIG. 11 is a diagram illustrating a schematic configuration of a vehicle height adjustment device 2700 according to a second embodiment.

FIG. 11 is a diagram showing a schematic configuration of a vehicle height adjustment device 2700 according to a second embodiment.

The vehicle height adjustment device 2700 of the second embodiment is different from the vehicle height adjustment device 700 of the first embodiment in that a suspension device 223 is provided instead of the suspension device 23 and a control device 220 is provided instead of the control device 20. The suspension device 223 is different from the suspension device 23 in that the suspension device 223 includes a switching unit 2800 instead of the switching unit 800. The control device 220 is different from the control device 20 in a switching control mode of a flow path of oil. Hereinafter, differences from the vehicle height adjustment device 700 will be described. Components having the same shape and function in the vehicle height adjustment device 2700 and the vehicle height adjustment device 700 are denoted by the same reference numerals, and a detailed description thereof will be omitted.

As shown in FIG. 11, the switching unit 2800 of the suspension device 223 is different from the switching unit 800 of the first embodiment in the configuration of the solenoid valve 291.

The solenoid valve 291 includes a solenoid having the coil, the core disposed inside the coil, the plunger guided by the core, and the operating rod connected to the plunger. The solenoid causes the plunger to generate thrust in an axial direction such that an amount of protrusion of the operating rod from the case increases as an energizing current applied to the coil increases. An energizing amount supplied to the coil is controlled by the control device 220.

The solenoid valve 291 includes the first control valve V1, the second control valve V2, and a third control valve V3 which control the flow of oil in the first flow path 801 and the second flow path 802. The first control valve V1 and the second control valve V2 are as described in the first embodiment.

The third control valve V3 allows the flow of the oil from the reservoir chamber 40 toward the pump 600 and restricts the flow of the oil from the pump 600 toward the reservoir chamber 40 in the first flow path 801. Further, the third control valve V3 allows the flow of the oil from the pump 600 toward the jack chamber 60, and restricts the flow of the oil from the jack chamber 60 toward the pump 600 in the second flow path 802.

The solenoid valve 291 is in a state in which the flow of oil is controlled by any one of the first control valve V1, the second control valve V2, and the third control valve V3 in accordance with the energizing amount. When the energization of the solenoid is stopped, the solenoid valve 291 is in a state in which the flow of oil is controlled by the first control valve V1.

The control device 220 controls the operations of the solenoid valve 291 and the gear pump 93 to control the switching among the first state to the fourth state and a fifth state. The first state to the fourth state are as described in the first embodiment described above, respectively. The fifth state will be described below.

(Fifth State)

As shown in FIG. 11, the solenoid valve 291 allows the flow of the oil from the reservoir chamber 40 toward the pump 600 and restricts the flow of the oil from the pump 600 toward the reservoir chamber 40 in the first flow path 801 by the third control valve V3. Further, the solenoid valve 291 allows the flow of the oil from the pump 600 toward the jack chamber 60 and restricts the flow of the oil from the jack chamber 60 toward the pump 600 in the second flow path 802 by the third control valve V3.

Then, in the fifth state, the motor 934 is not driven and the gear pump 93 is stopped.

The pilot valve 92 blocks the flow of the oil in the second flow path 802 and the seventh flow path 807. In addition, the check valve 94 restricts the flow of the oil toward the reservoir chamber 40 in the fourth flow path 804.

In the fifth state, the pump 600 discharges the oil in the cylinder 230 during compression. The oil discharged by the pump 600 flows into the jack chamber 60 through the second flow path 802, the fifth flow path 805, and the third flow path 803. On the other hand, when the pump 600 is extended, the flow of the oil from the reservoir chamber 40 to the pump 600 is generated.

In the fifth state, when the pump 600 is compressed, the oil is supplied from the pump 600 to the jack chamber 60. As the amount of the oil in the jack chamber 60 increases, the support portion 551 of the jack 550 moves to the spring 23s side, and the length of the spring 23s decreases.

As described above, the switching unit 2800 of the second embodiment can supply the oil to the jack chamber 60 only by the pump 600 without driving the gear pump 93.

The control device 220 receives a setting of a predetermined time (for example, 30 seconds) as a time required for the movement amount of the support portion 551 of the jack 550 to reach the target movement amount. The control device 220 calculates the movement speed of the support portion 551 of the jack 550 based on the movement amount in the first period after the switching unit 2800 is switched to the fifth state and the time taken until the movement amount is reached. When the movement speed is slower than a predetermined speed, the switching unit 2800 is switched to the first state, and the oil is supplied to the jack chamber 60 by using the gear pump 93. On the other hand, when the movement speed in the first period is faster than the predetermined speed, the fifth state is maintained.

The gear pump 93 consumes power when the motor 934 operates. Therefore, in the second embodiment, the motor 934 of the gear pump 93 is controlled in accordance with the supply of the oil by the pump 600. Accordingly, in addition to the effects obtained by the first embodiment, power saving can be achieved.

Third Embodiment

Figure 12:
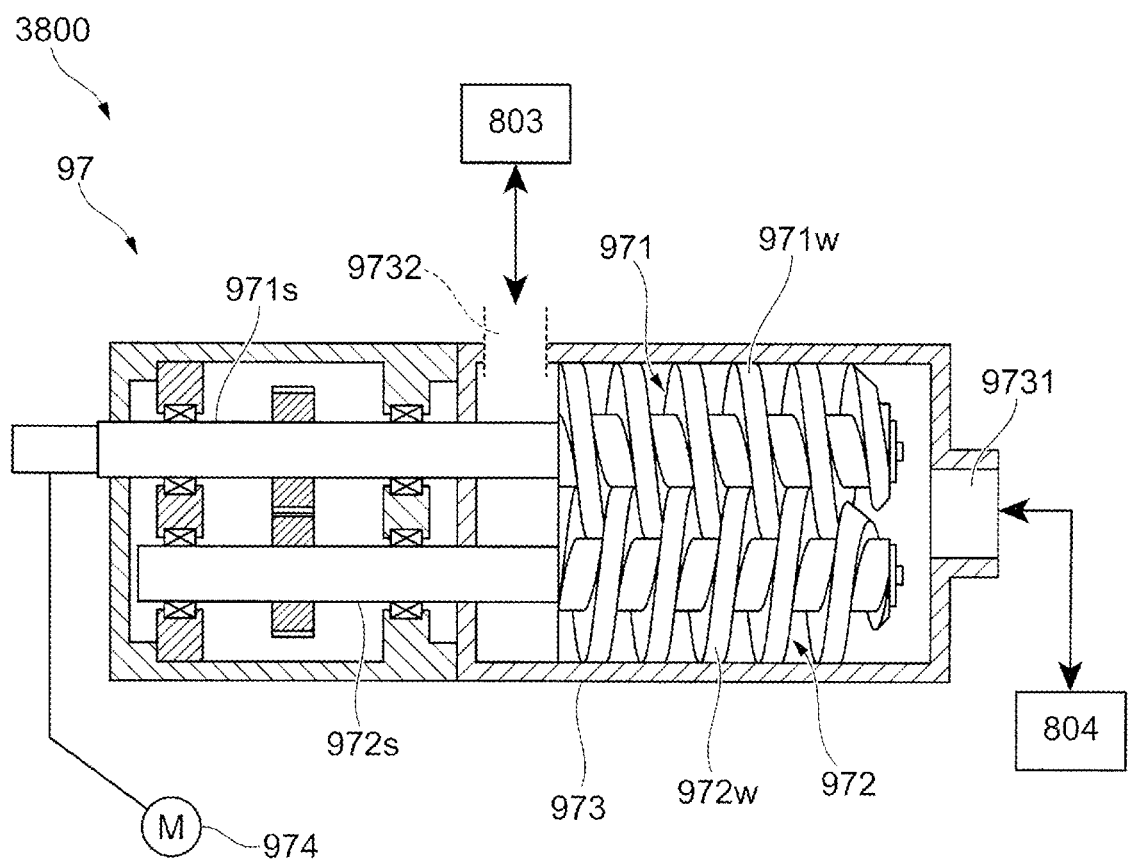
FIG. 12 is a cross-sectional view of a screw pump 97.

FIG. 12 is a cross-sectional view of a screw pump 97.

A switching unit 3800 of a third embodiment is different in that the switching unit 3800 includes the screw pump 97 instead of the gear pump 93. Hereinafter, differences from the switching unit 800 of the first embodiment will be described. Components having the same shape and function in the switching unit 3800 and the switching unit 800 are denoted by the same reference numerals, and a detailed description thereof will be omitted.

The screw pump 97, which is an example of the second pump, includes a first screw 971 and a second screw 972 which rotates in accordance with the first screw 971. In addition, the screw pump 97 includes a housing body 973 which rotatably supports the first screw 971 and the second screw 972, respectively, and houses the first screw 971 and the second screw 972. The screw pump 97 further includes a motor 974 which drives the first screw 971.

The first screw 971 has a spiral blade 971w on a rotation shaft 971s, and is rotated by being driven by the motor 974. In addition, the second screw 972 has a spiral blade 972w on a rotation shaft 972s, and rotates in synchronization with the rotation shaft 971s of the first screw 971. The first screw 971 and the second screw 972 transport oil in the axial direction while compressing the oil. In addition, the first screw 971 and the second screw 972 are configured such that the oil transport direction is switched in accordance with the driving direction of the motor 974.

The housing body 973 has a first opening portion 9731 and a second opening portion 9732, which are parts of a flow path of oil flowing inside and outside the housing body 973. The first opening portion 9731 is connected to the fourth flow path 804. In addition, the second opening portion 9732 is connected to the third flow path 803.

The screw pump 97 causes the first screw 971 to rotate in the first direction, thereby causing the second screw 972 to rotate in synchronization with the first screw 971, causing the oil to flow into the housing body 973 from the first opening portion 9731, and causing the compressed oil to flow out from the second opening portion 9732.

On the other hand, the screw pump 97 causes the first screw 971 to rotate in the second direction opposite to the first direction, thereby causing the second screw 972 to rotate in synchronization with the first screw 971, causing the oil to flow into the housing body 973 from the second opening portion 9732, and causing the compressed oil to flow out from the first opening portion 9731.

The screw pump 97 configured as described above can control the flow direction of the oil in the third flow path 803 and the fourth flow path 804. In the switching unit 3800 of the third embodiment in which the screw pump 97 is used as the second pump, the switching unit 3800 can be controlled to any one of the first state to the fourth state. Therefore, also in the third embodiment, it is possible to achieve the same effects as those of the first embodiment.

Fourth Embodiment

Figure 13:
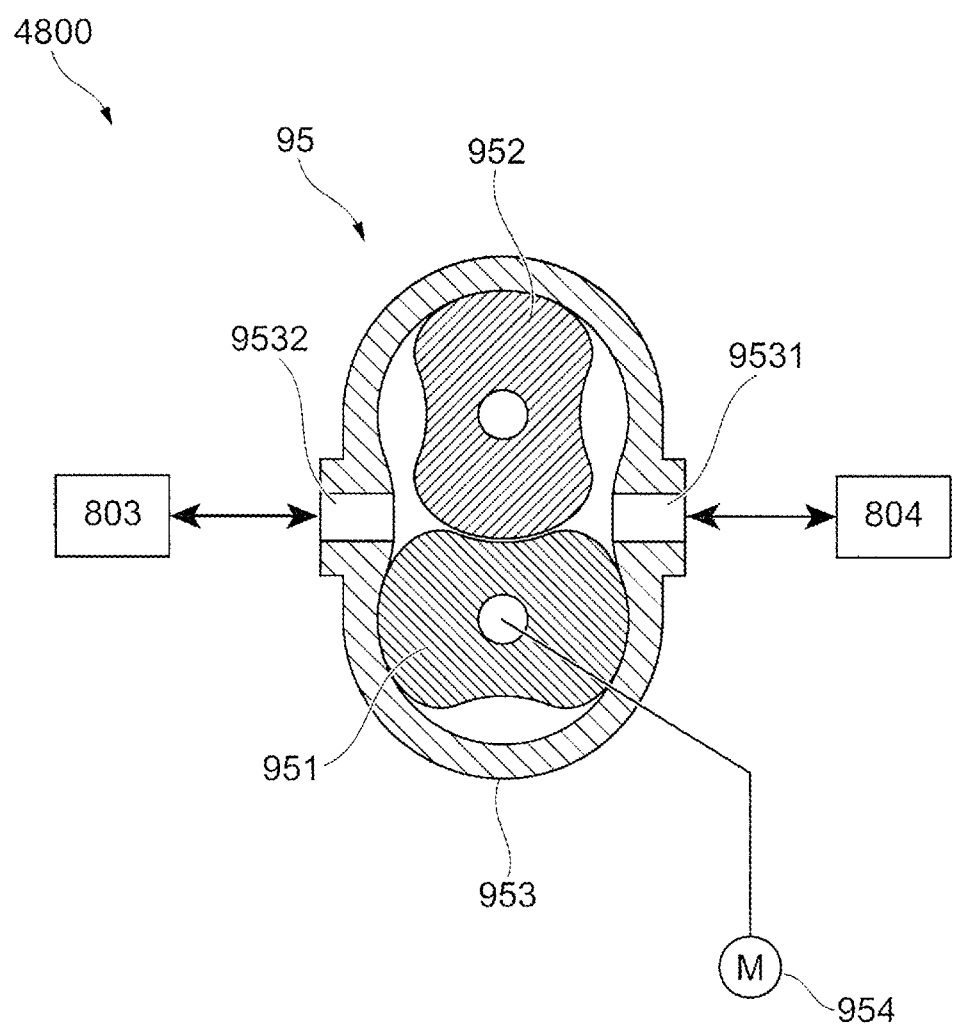
FIG. 13 is a cross-sectional view of a roots pump 95.

FIG. 13 is a cross-sectional view of a roots pump 95.

A switching unit 4800 of a fourth embodiment is different in that the switching unit 4800 includes the roots pump 95 instead of the gear pump 93. Hereinafter, differences from the switching unit 800 of the first embodiment will be described. Components having the same shape and function in the switching unit 4800 and the switching unit 800 are denoted by the same reference numerals, and a detailed description thereof will be omitted.

The roots pump 95, which is an example of the second pump, includes a first rotor 951 and a second rotor 952 which rotates in synchronization with the first rotor 951. In addition, the roots pump 95 includes a housing body 953 which rotatably supports the first rotor 951 and the second rotor 952, respectively, and houses the first rotor 951 and the second rotor 952. The roots pump 95 further includes a motor 954 which drives the first rotor 951 and the second rotor 952.

Each of the first rotor 951 and the second rotor 952 is formed in a shape of an Arabic numeral 8. The first rotor 951 and the second rotor 952 are driven by the motor 954 and rotate so as not to come into contact with each other. The first rotor 951 and the second rotor 952 transport oil while compressing the oil. In addition, the first rotor 951 and the second rotor 952 are configured such that the oil transport direction is switched in accordance with the driving direction of the motor 954.

The housing body 953 includes a first opening portion 9531 and a second opening portion 9532, which are parts of a flow path of oil flowing inside and outside the housing body 953. The first opening portion 9531 is connected to the fourth flow path 804. In addition, the second opening portion 9532 is connected to the third flow path 803.

The roots pump 95 causes the first rotor 951 to rotate in the first direction, thereby causing the second rotor 952 to rotate, causing the oil to flow into the housing body 953 from the first opening portion 9531, and causing the compressed oil to flow out from the second opening portion 9532.

On the other hand, the roots pump 95 causes the first rotor 951 to rotate in the second direction opposite to the first direction, thereby causing the second rotor 952 to rotate, causing the oil to flow into the housing body 953 from the second opening portion 9532, and causing the compressed oil to flow out from the first opening portion 9531.

The roots pump 95 configured as described above can control the flow direction of the oil in the third flow path 803 and the fourth flow path 804. In the switching unit 4800 of the fourth embodiment in which the roots pump 95 is used as the second pump, the switching unit 4800 can be controlled to any one of the first state to the fourth state. Therefore, also in the fourth embodiment, it is possible to achieve the same effects as those of the first embodiment.

For example, the control device 20 of the first embodiment controls the switching unit 800 based on the movement amount of the support portion 551 of the jack 550 detected by the detection unit 20a when the switching unit 800 is set to the first state to increase the vehicle height, but the present invention is not limited to this aspect. The control device 20 may control the switching unit 800 based on a stroke sensor which detects a stroke amount of the suspension device 23. In addition, the control device 20 may set the switching unit 800 to the first state for only a predetermined time such that the movement amount of the support portion 551 of the jack 550 becomes the target movement amount. This content is the same in the second embodiment to the fourth embodiment.

The invention claimed is:

1. A suspension device, comprising:
a spring which has a first end supported on a vehicle body side and a second end supported on a wheel side, the second end being an end opposite to the first end;
a jack which supports the first end or the second end, includes a jack chamber housing oil, and adjusts a length of the spring in accordance with an amount of the oil in the jack chamber;
a reservoir chamber which reserves the oil;
a first pump which includes a cylinder, sucks the oil into the cylinder when a relative distance between the vehicle body and the wheel becomes large, and discharges the oil in the cylinder to the jack chamber when the relative distance becomes small;
a second pump configured to send the oil from the reservoir chamber to the jack chamber by being driven by a drive unit; and
an opening and closing unit which has a housing chamber housing the oil, and opens and closes a first flow path of the oil between the jack chamber and the reservoir chamber in accordance with an amount of the oil in the housing chamber, wherein the second pump is configured to cause the oil to flow into the housing chamber and to cause the oil to flow out from the housing chamber, and the opening and closing unit is connected to a second flow path through which the oil flows between the opening and closing unit and the second pump.

2. A saddle-ride type vehicle, comprising:

a vehicle body;

wheels; and the suspension device according to claim 1.

3. The suspension device according to claim 1, wherein the opening and closing unit has a moving portion, and opens and closes the first flow path by moving the moving portion in a longitudinal direction of the opening and closing unit.

4. A vehicle height adjustment device, comprising:

a spring which has a first end supported on a vehicle body side and a second end supported on a wheel side, the second end being an end opposite to the first end;

a jack which supports the first end or the second end, includes a jack chamber housing oil, and adjusts a length of the spring in accordance with an amount of the oil in the jack chamber;

a reservoir chamber which reserves the oil;

a first pump which includes a cylinder, sucks oil into the cylinder when a relative distance between the vehicle body and the wheel becomes large, and discharges the oil in the cylinder to the jack chamber when the relative distance becomes small;

a second pump configured to send the oil from the reservoir chamber to the jack chamber by being driven by a drive unit; and a control unit configured to control driving of the drive unit, wherein the control unit is configured to drive the drive unit in accordance with information on a time of movement of the jack.

5. A saddle-ride type vehicle, comprising:

a vehicle body;

wheels; and the vehicle height adjustment device according to claim 4.

6. A vehicle height adjustment device, comprising:

a spring which has a first end supported on a vehicle body side and a second end supported on a wheel side, the second end being an end opposite to the first end;

a jack which supports the first end or the second end, includes a jack chamber housing oil, and adjusts a length of the spring in accordance with an amount of the oil in the jack chamber;

a reservoir chamber which reserves the oil;

a first pump which includes a cylinder, sucks oil into the cylinder when a relative distance between the vehicle body and the wheel becomes large, and discharges the oil in the cylinder to the jack chamber when the relative distance becomes small;

a second pump configured to send the oil from the reservoir chamber to the jack chamber by being driven by a drive unit;

a control unit configured to control driving of the drive unit; and an opening and closing unit which has a housing chamber housing the oil, and opens and closes a first flow path of the oil between the jack chamber and the reservoir chamber in accordance with an amount of the oil in the housing chamber, wherein the control unit is configured to stop the drive unit after the opening and closing unit opens the first flow path by the second pump controlling the oil in the housing chamber, and the opening and closing unit is connected to a second flow path through which the oil flows between the opening and closing unit and the second pump.

7. A saddle-ride type vehicle, comprising:

a vehicle body;

wheels; and the vehicle height adjustment device according to claim 6.

\* \* \* \* \*